United States Patent
Hansen

(10) Patent No.: US 11,794,151 B1
(45) Date of Patent: Oct. 24, 2023

(54) AUTOMATIC BRINE SALINITY CONTROL SYSTEM

(71) Applicant: Thomas L. Hansen, Elkhorn, NE (US)

(72) Inventor: Thomas L. Hansen, Elkhorn, NE (US)

(73) Assignee: Dultmeier Sales LLC, Omaha, NE (US)

( * ) Notice: Subject to any disclaimer, the term of this patent is extended or adjusted under 35 U.S.C. 154(b) by 331 days.

(21) Appl. No.: 17/408,709

(22) Filed: Aug. 23, 2021

(51) Int. Cl.
*B01F 21/20* (2022.01)
*B01F 21/00* (2022.01)
*B01F 23/00* (2022.01)
*B01F 23/45* (2022.01)
*G05D 11/13* (2006.01)
*B01F 23/40* (2022.01)

(52) U.S. Cl.
CPC ............. *B01F 21/30* (2022.01); *B01F 21/20* (2022.01); *B01F 23/09* (2022.01); *B01F 23/45* (2022.01); *G05D 11/135* (2013.01); *B01F 23/48* (2022.01)

(58) Field of Classification Search
CPC .......... B01F 21/20; B01F 21/30; B01F 23/45; G05D 11/132; G05D 11/135; G05D 11/139
See application file for complete search history.

(56) References Cited

U.S. PATENT DOCUMENTS

| | | | |
|---|---|---|---|
| 3,607,105 A * | 9/1971 | Reid | B01F 33/8212 210/138 |
| 4,823,087 A | 4/1989 | Sugimori | |
| 5,522,660 A * | 6/1996 | O'Dougherty | B01F 25/51 366/136 |
| 5,911,238 A | 6/1999 | Bump et al. | |
| 5,944,048 A | 8/1999 | Bump et al. | |
| 5,975,126 A | 11/1999 | Bump et al. | |
| 6,923,568 B2 * | 8/2005 | Wilmer | B01F 25/3131 366/152.2 |
| 9,156,013 B2 * | 10/2015 | Hildreth | B01F 35/1453 |
| 9,470,568 B2 | 10/2016 | Patten et al. | |
| 10,376,854 B2 | 8/2019 | Hildreth et al. | |
| 10,544,340 B2 | 1/2020 | Nesheim et al. | |
| 2007/0245832 A1 | 10/2007 | Schlosser et al. | |
| 2020/0370939 A1 | 11/2020 | Doerr et al. | |

* cited by examiner

*Primary Examiner* — Kevin F Murphy
(74) *Attorney, Agent, or Firm* — Suiter Swantz PC LLO

(57) ABSTRACT

An automatic brine salinity control system receives salt brine, by way of an on-off valve, at its inner end. The control system also receives fresh water, by way of a control valve, from a source of fresh water. The salt brine and the fresh water are mixed to reduce the salinity of the mixture. The salt brine-fresh water mixture is fed to the inner end of a mass flow sensor which measures the mass flow rates, density, volume flow rate, temperature and concentration thereof and transfers the data to a Programmable Logic Controller and computer. The mixture, after being discharged from the mass flow sensor, is fed to a three-way valve which is selectively connected to a storage tank, a waste tank or the brine production system. The PLC and computer controls the operation of the three-way valve, the control valve and the on-off valve.

6 Claims, 2 Drawing Sheets

AUTOMATIC BRINE SALINITY CONTROL SYSTEM

BACKGROUND OF THE INVENTION

Field of the Invention

This invention relates to an apparatus for automatically controlling and recording the salinity of a salt brine solution to a user settable target salinity for entire batches of a salt brine solution being sent to brine storage tanks for eventual use in liquid salt brine applications on roadways. This invention also relates to the method of automatically controlling the salinity of a salt brine solution and recording the results of such automatic control for future reference.

Description of the Related Art

Salt brine solutions (NaCl in water) are formed by dissolving a solid salt (NaCl) in water with the salt brine solutions having been used in a variety of industrial applications, including the use of the salt brine solutions for the melting and the removal of snow and ice from sidewalks, driveways, roadways, runways and the like. The prior art salt brine solutions were generally created by directing water through a "bed" of solid salt, to produce a highly concentrated (highly saline) solution. The salt brine solutions were then adjusted to a desired concentration (salinity) for proper use in the liquid salt brine deicing of roadways and other pavements. It has been found that the salinity of sale brine solution concentration of approx. 23.3% to 24% by weight is the most effective solution for melting ice and snow on roadways. At this concentration, the salt brine solution will melt ice and snow with an ambient temperature of approx. −1 to −6 degrees Fahrenheit. If the desired salt brine solution's concentration is not maintained properly in the production process, and then applied on roadways, the liquid deicing may not be effective and accidents may occur. Thus, it is desirable to quickly and accurately produce large quantities of salt brine solutions at a proper specified concentration (salinity), for use by road maintenance crews to help in effectively clearing roadways of ice and snow. Highway maintenance crews typically store large piles of salt, some of which is quickly made into a salt brine solution for eventual loading onto deice spray trucks, for liquid salt brine application to roadways before, during and after storm events for more effective road maintenance. Highway Departments have heretofore had problems in quickly and accurately producing large quantities of salt brine solutions near the proper "target" concentration (salinity) for best results when applied on roadways.

Apparatuses employed for producing and monitoring salt brine solutions for highway maintenance purposes have used various methods for measuring the salt brine solution's concentration (salinity). Some prior art methods include using a handheld hydrometer or "salimeter" (a hydrometer specifically graduated for salt brine solution) to determine the salinity of the solution, then manually opening or closing a small water inlet valve to add more or less fresh water to the solution and therefore adjust the concentration (salinity) more closely to target concentration. Hydrometers and salimeters measure the specific gravity of the salt brine solution which is proportional to the concentration (salinity), when properly adjusted for temperature of the solution. Other methods utilize conductivity sensors, which measure the conductivity of the salt brine solution and correlate it to salinity using pre-determined curves of conductivity versus concentration (salinity). Other methods utilize electronic specific gravity hydrometers. These methods have proven to be inadequate from an accuracy standpoint for a number of reasons.

SUMMARY OF THE INVENTION

This Summary is provided to introduce a selection of concepts in a simplified form that are further described below in the Detailed Description. This Summary is not intended to identify key aspects or essential aspects of claimed subject matter. Moreover, this Summary is not intended for use as an aid in determining the scope of the claimed subject matter.

An automatic brine salinity control system is disclosed. The system of this invention includes a salt brine solution inlet pipe having a fluid intake end and a fluid discharge end with the fluid intake end of the salt brine solution inlet pipe being configured to be fluidly connected to a salt brine production system. The system also includes a first tee having an intake end, a fluid discharge end and a first pressure gauge end. A pressure gauge is positioned in the first pressure gauge end of the first tee. The fluid intake end of the first tee is fluidly connected to the fluid discharge end of the salt brine solution inlet pipe. The system further includes a second tee, which is a mixing tee, having a first fluid intake end, a second fluid intake end, and a fluid discharge end. The first fluid intake end of the second tee is fluidly connected to the fluid discharge end of the first tee.

The system also includes a fresh water intake pipe having a fluid intake end and a fluid discharge end with the fluid intake end of the fresh water inlet pipe being configured to be fluidly connected to a source of fresh water. A first pressure regulator is imposed in the fresh water inlet pipe downstream of the fluid inlet end thereof. An electric water control valve, having a water intake end and a water discharge end, is imposed in the fresh water inlet pipe downstream of the pressure gauge therein. A third tee is provided in the system and has a fluid intake end, a fluid discharge end, and a pressure gauge end with the fluid intake end of the third tee being fluidly connected to the fluid discharge end of the fresh water inlet pipe. The third tee has a pressure gauge mounted in the pressure gauge end thereof. The fluid discharge end of the third tee is fluidly connected to the second fluid intake end of the second tee. A fourth tee is also provided and has a fluid intake end and a fluid discharge end with the fluid intake end of the fourth tee being fluidly connected to the fluid discharge end of the third tee.

The system includes a mass flow sensor, which will be described in detail hereinafter. The mass flow sensor includes a body portion having a fluid intake end and a fluid discharge end. The fluid intake end of the body portion of the mass flow sensor is fluidly connected to the fluid discharge end of the fourth tee. The mass flow sensor includes a U-shaped tube having a fluid intake end and a fluid discharge end with the fluid intake end of the U-shaped tube being fluidly connected to the body portion of the mass flow sensor at the fluid intake end of the body portion of the mass flow sensor. The fluid intake end of the U-shaped tube is fluidly connected to the body portion of the mass flow sensor at the fluid discharge end of the body portion of the mass flow sensor. A data transmitter is associated with the U-shaped tube of the mass flow sensor at the fluid intake end thereof.

A fifth tee is provided which has a first fluid intake end, a second fluid intake end, and a fluid discharge end. The first fluid intake end of the fifth tee is fluidly connected to the fluid discharge end of the body portion of the mass flow sensor. The second fluid intake end of the fifth tee is configured to be fluidly connected to a source of flush water. A three-way valve is provided which has a fluid intake end, a first discharge end, and a second fluid discharge end. The fluid discharge end of the fifth tee is fluidly connected to the fluid intake end of the three-way valve. The first fluid discharge end of the three-way valve is selectively fluidly connected to a brine storage tank. The second fluid discharge end of the three-way valve is selectively fluidly secured to the brine production system or to a waste water tank.

The system includes a control panel having a Programmable Logic Controller (PLC) associated therewith. The PLC is cable connected to the transmitter of the mass flow sensor, to the electric water on-off valve, to the control valve, and to the three-way valve.

The mass flow sensor continually measures the mass flow rate (LB flow per second), the volume metric flow rate (gallons per second), density of the fluid (LBS per gallon), along with the temperature of the fluid. Using the density of the salt brine solution and its temperature, along with the sensor's internal formulas for concentration, the system provides an accurate and continual measurement of the salt brine solution's concentration in real time. The system includes a small water control regulating valve that is controlled by the programmable logic controller (PLC) and (PID) proportional-integral-derivative process loop, to continually regulate a small volume of fresh water into the salt brine solution stream to keep the cumulative salinity of the finished salt solution very close to its preset "Target" salinity.

The three-way discharge valve described above directs salt brine solution that is at or above the "Target" salinity into the finished salt brine storage tanks but also bypasses salt brine solution that is below the "Target" salinity back to the salt brine production system or to "Reuse tanks" after a user will adjust the time delay for bypass. The system also records key data, including the cumulative salinity of the entire batch process, for all finished salt brine solution that is discharged to the salt brine storage tanks. The final salt brine solution that is produced and stored in a storage tank is then loaded into de-iced spray trucks for eventual spraying onto the roadways to more effectively melt ice and snow.

It is an object of the invention to use a mass flow sensor, to produce salt brine solutions with accurate and controlled concentrations (salinity), within a very close percentage of the pre-set "Target" percentage salinity pre-set by the operator.

It is an object of the invention to automatically and properly account for dirt contaminants in the salt brine solution using a "dirt correction factor".

It is an object of the invention to automatically adjust the amount of fresh water added to the salt brine solution using a P.I.D. process loop to accurately control its concentration (salinity) within a close percentage of the pre-set "Target" percentage salinity pre-set by the operator.

It is an object of the invention to automatically and continuously record the overall cumulative salinity of the salt brine solution being sent to the finished salt brine storage tanks.

It is an object of the invention to bypass salt brine solution that is less than the "Target" percentage salinity back to the brine production system or to waste tanks and also not cumulate or record data for bypass solution based on a user settable time delay.

It is an object of the invention to reduce the labor required and also increase the accuracy of the production and processing of large quantities of salt brine solution at proper concentrations.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
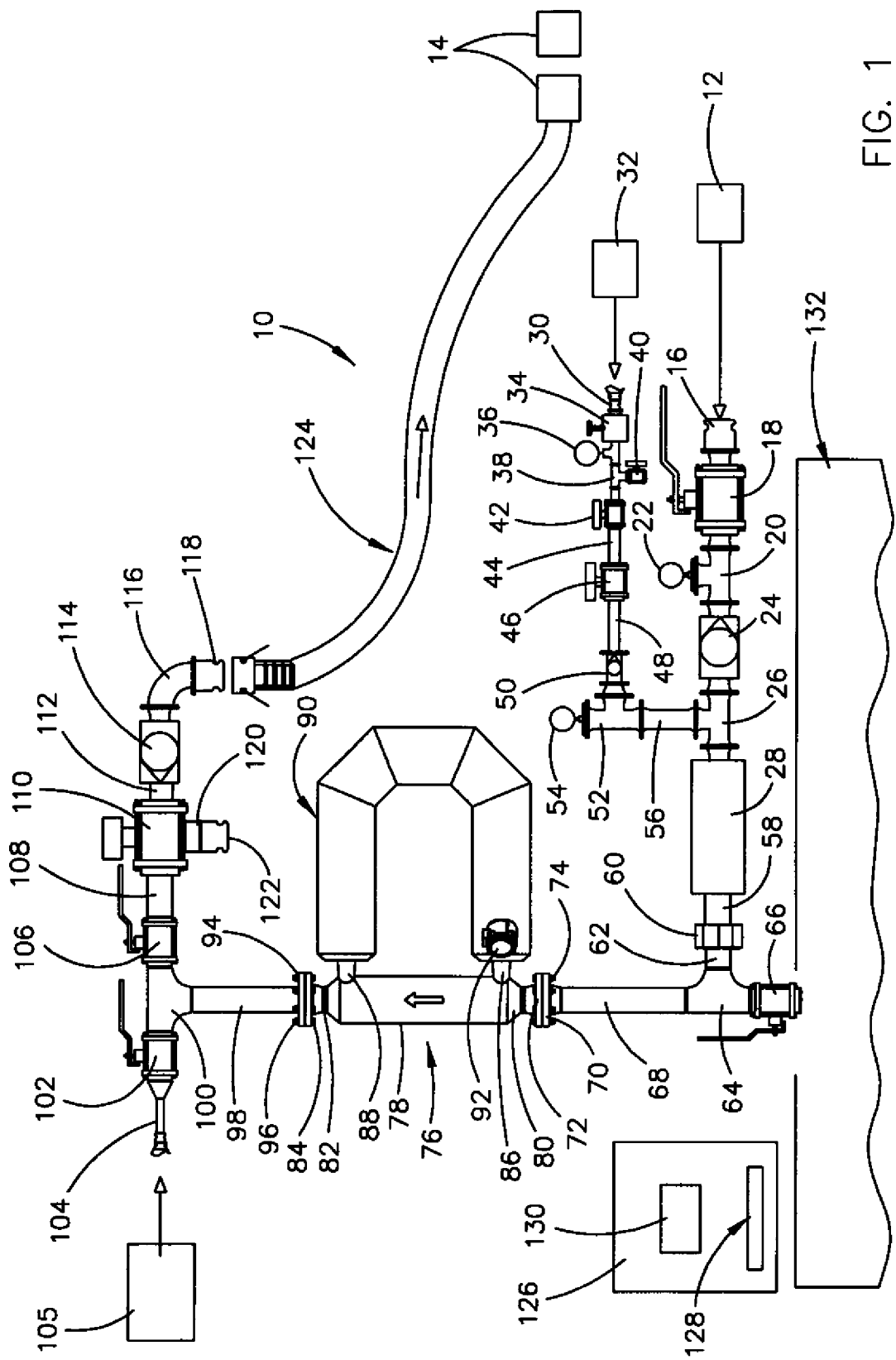
FIG. 1 is a schematic diagram of the automatic salt brine concentration (salinity) control system of this invention.
Figure 2:
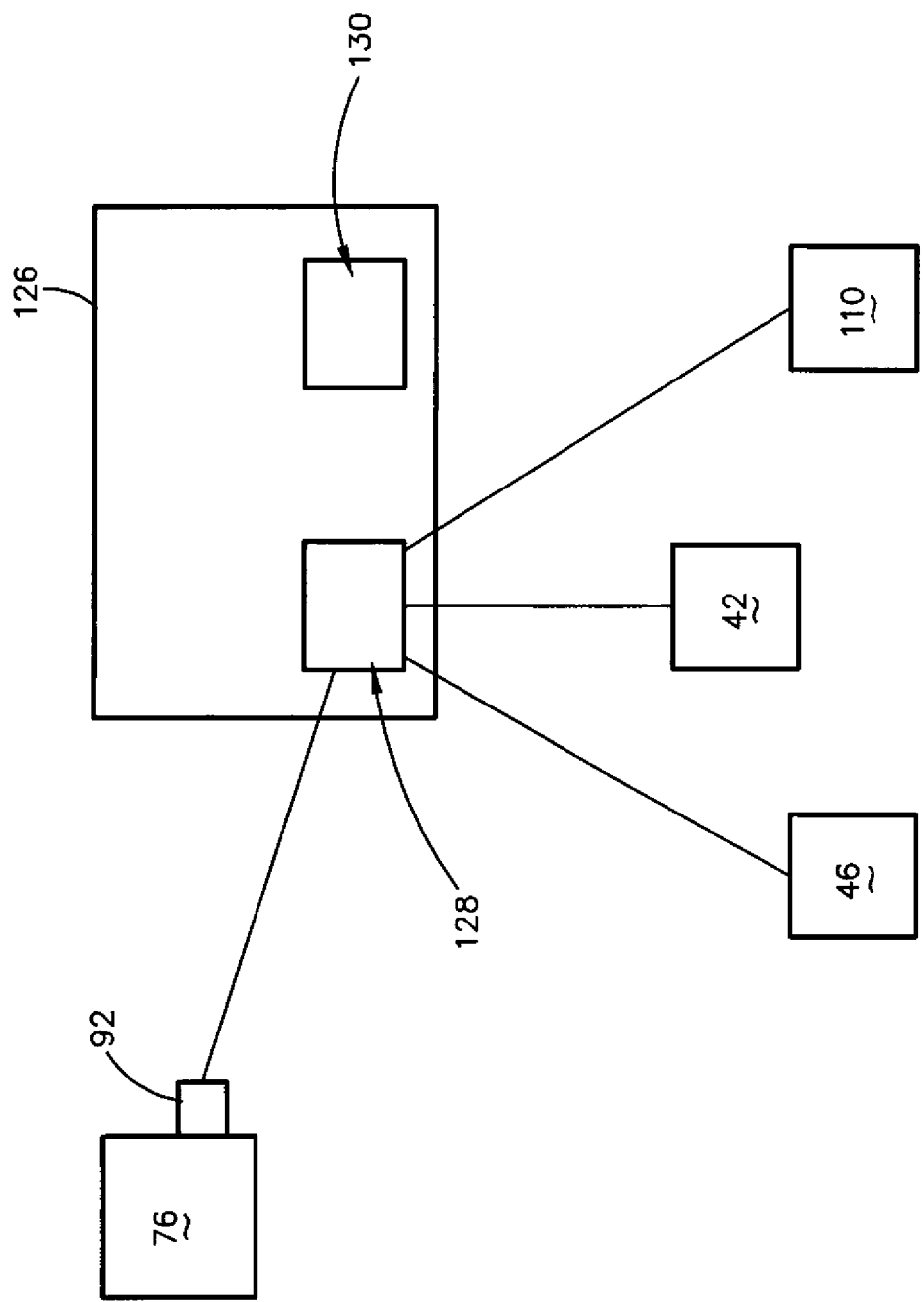
FIG. 2 is a schematic diagram of the automatic salt brine concentration (salinity) control system of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The automatic brine salinity control system is referred to by the reference numeral 10. Control system 10 is designed and configured to automatically control the salinity of brine passing from a brine production system 12 to brine storage tanks 14. Control system 10 has an inlet pipe or tube 16 which is fluidly connected to the brine production system 12. Pipe 16 is fluidly connected to the inlet side of a manual operated salt brine solution inlet valve 18. The discharge side of valve 18 is fluidly connected to a tee 20 having a pressure gauge 22. The discharge side of tee 20 is fluidly connected to the inlet side of one-way check valve 24. The discharge side of check valve 24 is fluidly connected to the one of inlet sides of a mixing tee 26. The discharge side of mixing tee 26 is fluidly connected to the inlet side of a static mixer 28.

The numeral 30 refers to an inlet pipe which is connected to a source of fresh water 32. The discharge side of inlet pipe 30 is fluidly connected to a pressure regulator 34 including a pressure gauge 36. The discharge side of pressure gauge 36 is fluidly connected to a tee 38. A manual operated water drain valve 40 is fluidly connected to one of the discharge sides of the tee 38. An electric water on-off valve 42 is fluidly connected to the other discharge side of tee 38. Pipe 44 extends from the discharge side of valve 42 and is fluidly connected to a water regulator control valve 46. Pipe 48 extends from the discharge side of valve 46 and is fluidly connected to the inlet side of a one-way check valve 50. The discharge side of check valve 50 is fluidly connected to a tee 52 having a pressure gauge 54. A coupling or pipe 56 extends from the discharge side of tee 52. As seen, the discharge end of coupling 56 is fluidly connected to an intake side of tee 26. As stated above, the discharge side of tee 26 is fluidly connected to the inlet side of static mixer 28.

Pipe or nipple 58 extends from the discharge side of static mixer 28. A union 60 joins nipple 58 to a nipple 62. The discharge end of nipple 62 is fluidly connected to the inlet side of a tee 64. As seen, one discharge side of tee 64 has a manual brine drain valve 66. As also seen, a pipe or nipple 68 extends from tee 64. A flange member 70 is secured to the end of pipe 68. A flange member 72 is bolted to flange member 70 by bolts 74.

The numeral 76 refers to a mass flow sensor having a body portion 78 and ends 80 and 82. The mass flow sensor 76 utilized in this invention was a Corliolis Flow and Density Meter which is sometimes referred to as "mass flow meter". The particular mass flow sensor of this invention was Model CFM200H/B. More information about mass flow sensors may be found in link: Micro Motion Elite Corliolis Flow and Density Meters (emerson.com). End 80 of mass flow sensor 76 is fixed to flange member 72. End 82 of mass flow sensor 76 is secured to a flange member 84. Mass flow sensor 76 has a pipe or tube 86 extending from body portion 78 adjacent end 80 thereof and has a pipe or tube 88 extending from body portion 78 adjacent end 82 thereof. Pipes 86 and 88 are in fluid communication with the interior of body portion 78 of mass flow sensor 76. A U-shaped tube 90 extends between pipes 86 and 88 and is in fluid communication with pipes 86 and 88. U-shaped tube 90 includes a transmitter 92 as will be described in more detail hereinafter.

A flange member 94 is bolted to flange member 82 by bolts 96. Pipe or nipple 98 extends from flange member 94 to a tee 100. An inlet side of tee 100 has a manual flush clean-out valve 102 secured thereto. Pipe or nipple 104 extends from valve 102 to a source of flush water 105.

A manual throttle valve 106 is fluidly connected to the discharge side of tee 100. Pipe or nipple 108 extends from the discharge side of valve 106 and is fluidly connected to a three-way valve 110. A nipple 112 extends from one discharge side of valve 110 and is fluidly connected to a one-way check valve 114. A flanged elbow 116 extends from the discharge side of valve 114 and has a male adapter 118 mounted on the discharge end of elbow 116. A nipple 120 extends from the three-way valve 112 and has a male adapter 122 mounted therein. The numeral 124 refers to an elongated hose which may be selectively secured to either of the male adapters 118 and 120. Hose 124 extends to the storage tank or tanks 14. A hose may be attached to the adapter 122 which extends to a waste tank. Control system 10 includes a control panel 126 including a Programmable Logic Controller (PLC) 128 and a proportional—integral— derivative process loop 130 therein. The PLC 128 is cable connected to the transmitter 92 of mass flow sensor 76, the valves 42, 46 and 110 to control the operation thereof.

In operation, the salt brine solution from the brine production system 12 is fed to the second tee 26. At the same time, fresh water is fed into the second tee 26 wherein it is mixed with the salt brine solution from the brine production system 12. The mixture of the fresh water and the salt brine solution from the brine production system 12 is fed into the intake end 80 of the mass flow sensor 76. The mass flow sensor 76 continually measures the mass flow rate (LB flow per second) the Volumetric flow rate (gallons per second), Density of the Liquid (LBS per gallon) along with the Temperature of the liquid. Further, using the density of the salt brine solution and its temperature, along with the sensor's internal formulas for concentration, the system 10 provides an accurate and continual measurement of the salt brine solution's concentration (salinity) in real time. That data is transmitted to the PLC 128. If the salinity of the solution is too high, the PLC 128 will increase the flow of fresh water through the control valve 46 to decrease the salinity of the solution. If the salinity of the solution is too low, the PLC 128 will reduce the flow of fresh water through the control valve 46. If the salinity of the solution is within the limits of the Target in the PLC 128, the three-way valve 110 will be operated by the PLC 128 to direct the flow of the solution to the storage tank or tanks 14. If the salinity of the solution is less than the Target percentage salinity in the PLC 128, the PLC 128 will operate the three-way valve 110 so that the solution will be sent to a waste tank or back to the brine production system 12.

Although it is preferred that all of the components of the system 10 shown in FIG. 1 and described hereinabove be used, some of the components of system 10 may be omitted. One or more of the components of system 10 which may be omitted are:
  Salt brine solution inlet valve (18);
  One-way check valve (24);
  Static mixer (28);
  Pressure regulator (34);
  Mondal water drain valve (40);
  Electric water on-off valve (42);
  One-way check valve (50);
  Manual brine drain valve (66);
  Manual-flush clean-out valve (102);
  Manual throttle valve (106); and
  One-way check valve (114).

Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An automatic brine salinity control system; comprising:
   a salt brine solution inlet valve having a fluid intake side and a fluid discharge side;
   said fluid intake side of said salt brine solution valve being configured to be fluidly connected to a salt brine production system;
   a first tee having a fluid intake end, a fluid discharge end and a first pressure gauge end;
   said fluid intake end of said first tee being fluidly connected to said fluid discharge side of said salt brine solution inlet valve;
   a first one-way check valve having a fluid intake side and a fluid discharge side;
   said fluid intake side of said first one-way check valve being fluidly connected to said fluid discharge end of said first tee;
   a second tee having a first fluid intake end, a second fluid intake end, and a fluid discharge end;
   said first fluid intake end of said second tee being fluidly connected to said fluid discharge side of said first one-way check valve;
   a fresh water inlet pipe having an intake end and a discharge end;
   said intake end of said fresh water inlet pipe being configured to be fluidly connected to a source of fresh water;

a second pressure regulator imposed in said fresh water inlet pipe downstream of said intake end of said fresh water inlet pipe;

a manual fresh water drain valve imposed in said fresh water inlet pipe downstream of said second pressure regulator;

an electric water on-off valve imposed in said fresh water inlet pipe downstream of said manual water drain valve;

a water control valve, having an intake side and a discharge side, imposed in said fresh water inlet pipe downstream of said electric water on-off valve;

a second one-way check valve, having an inlet side and a discharge side, imposed in said fresh water inlet pipe downstream of said water control valve;

a third tee having a fluid intake end, a fluid discharge end, and a pressure gauge side;

said fluid intake end of said third tee being fluidly connected to said discharge side of said second one-way check valve;

said pressure gauge side of said third tee having a pressure gauge positioned therein;

said fluid discharge end of said third tee being fluidly connected to said second fluid intake end of said second tee;

a static mixer having a fluid intake end and a fluid discharge end;

said fluid discharge end of said second tee being fluidly connected to said fluid intake end of said static mixer;

a fourth tee having a fluid intake end, a first fluid discharge end and a second fluid discharge end;

said fluid intake end of said fourth tee being fluidly connected to said fluid discharge end of said static mixer;

a manual brine drain, having a fluid intake end and a fluid discharge end;

said fluid intake end of said manual brine drain valve being fluidly connected to said second fluid discharge end of said fourth tee;

a mass flow sensor including a body portion having a fluid intake end and a fluid discharge end;

said fluid intake end of said body portion of said mass flow sensor being fluidly connected to said second discharge end of said fourth tee;

said mass flow sensor also including a U-shaped tube having a fluid intake end and a fluid discharge end;

said fluid intake end of said U-shaped tube being fluidly connected to said body portion of said mass flow sensor at said fluid intake end of said mass flow sensor;

said fluid discharge end of said U-shaped tube being fluidly connected to said body portion of said mass flow sensor at said fluid discharge end of said mass flow sensor;

a transmitter associated with said U-shaped tube at said fluid intake end of said U-shaped tube;

a fifth tee having a first fluid intake end, a second fluid intake end, and a fluid discharge end;

said first intake end of said fifth tee being fluidly connected to said fluid discharge end of said body portion of said mass flow sensor;

a manual flush-out clean-out valve having a fluid intake end and a fluid discharge end;

said fluid discharge end of said manual flash-out clean-out valve being fluidly connected to said second intake end of said fifth tee;

said fluid intake end of said manual flush-out clean-out valve being configured to be fluidly connected to a source of flush water;

a manual throttle valve having a fluid intake end and a fluid discharge end;

said fluid intake end of said throttle valve being fluidly connected to said fluid discharge end of said fifth tee;

a three-way valve having a fluid intake end, a first fluid discharge end and a second fluid discharge end;

said fluid intake end of said three-way valve being fluidly connected to said fluid discharge end of manual throttle valve;

a third one-way check valve having a fluid intake end and a fluid discharge end;

said fluid intake end of said third one-way check valve being fluidly connected to said first fluid discharge end of said three-way valve;

said fluid discharge end of said third one-way check valve being selectively fluidly connected to a brine storage tank;

said second fluid discharge end of said three-way valve being selectively fluidly connected to either the brine production system or a waste water tank; and a control panel including a Programmable Logic Controller and a computer which is cable connected to said transmitter of said mass flow sensor, said water on-off valve, said control valve and said three-way valve for controlling the operation of said water on-off valve, said control valve and said three-way valve.

2. The automatic brine salinity control system of claim 1 wherein said mass flow sensor continually measures the mass flow rate, the volume metric flow rate, the density and the temperature of the fluid passing therethrough and transmits the associated data to said Programmable Logic Controller and computer.

3. An automatic brine salinity control system, comprising:
a salt brine solution inlet pipe having a fluid intake end and a fluid discharge end;

said fluid intake end of said salt brine solution inlet pipe being configured to be fluidly connected to a salt brine production system;

a first tee having a fluid intake end and a fluid discharge end;

said fluid intake end of said first tee being fluidly connected to fluid discharge end of said salt brine solution inlet pipe;

a second tee having a first fluid intake end, a second fluid intake end, and a fluid discharge end;

said first fluid intake end of said second tee being fluidly connected to said fluid discharge end of said first tee;

a fresh water intake pipe having a fluid intake end and a fluid discharge end;

said fluid intake end of said fresh water intake pipe being configured to be fluidly connected to a source of fresh water;

said fresh water intake pipe having a pressure gauge imposed therein;

a water control valve, having a water intake end and a water discharge side, imposed in said fresh water inlet pipe;

a third tee having a fluid intake end, a fluid discharge end and a pressure gauge end;

said fluid intake end of said third tee being fluidly connected to said fluid discharge end of said fresh water inlet pipe;

said fluid discharge end of said third tee being fluidly connected to said second fluid intake end of said second tee;

a mass flow sensor including a body portion having a fluid intake end and a fluid discharge end;

said fluid intake end of said body portion of said mass flow sensor being fluidly connected to said fluid discharge end of said third tee;

said mass flow sensor including a U-shaped tube having a fluid intake end and a fluid discharge end;

said fluid intake end of said U-shaped tube being fluidly connected to said body portion of said mass flow sensor at said fluid intake end of said body portion of said mass flow sensor;

said first discharge end of said U-shaped tube being fluidly connected to said body portion of said mass flow sensor at said fluid discharge end of said body portion of said mass flow sensor;

a transmitter associated with said U-shaped tube of said mass flow sensor at said fluid intake end thereof;

a fourth tee having a first fluid intake end, a second fluid intake end, and a fluid discharge end;

said first fluid intake end of said fourth tee being fluidly connected to said fluid discharge end of said body portion of said mass flow sensor;

said second intake end of said fourth tee being configured to be fluidly connected to a source of flush water;

a three-way valve having a fluid intake end, a first fluid discharge end, and a second fluid discharge end;

said fluid discharge end of said fourth tee being fluidly connected to said fluid intake end of said three-way valve;

said first fluid discharge end of said three-way valve being selectively secured to a brine storage tank; and said second fluid discharge end of said three-way valve being selectively fluidly secured to said brine production system or a waste water tank; and a control panel including a Programmable Logic Controller and a computer which is cable connected to said transmitter of said mass flow sensor, a water on-off valve, said control valve and said three-way valve for controlling the operation of said water on-off valve, said control valve and said three-way valve.

4. The automatic brine salinity control system of claim 3 wherein said mass flow sensor continually measures the mass flow rate, the volume metric flow rate, the density and the temperature of the fluid passing therethrough and transmits the associated data to said Programmable Logic Controller and computer.

5. An automatic brine salinity control system, comprising:
a salt brine solution inlet pipe having a fluid intake end and a fluid discharge end;
said fluid intake side of said salt brine solution inlet pipe being configured to be fluidly connected to a salt brine production system;

a fresh water inlet pipe having a fluid intake end and a fluid discharge end;

said fluid intake end of said fresh water inlet pipe being configured to be connected to a source of fresh water;

a control valve, having a fluid intake side and a fluid discharge side, imposed in said fresh water inlet pipe downstream of said fluid intake end of said fresh water inlet pipe;

said fluid discharge side of said control valve being fluidly connected to said fluid discharge end of said salt brine solution inlet pipe;

a fluid outlet pipe having a fluid intake end and a fluid discharge end;

said fluid intake end of said fluid outlet pipe being fluidly connected to the fluid connection of said fluid discharge side of said control valve and said fluid discharge end of said salt brine solution inlet pipe;

a mass flow sensor having a fluid intake end and a fluid discharge end;

said fluid intake end of said main flow sensor being fluidly connected to said fluid discharge end of said fluid outlet pipe;

a tee having a first fluid intake end, a second fluid intake end and a fluid discharge end;

said first fluid intake end of said tee being fluidly connected to said fluid discharge end of said mass flow sensor;

said second fluid intake end of said tee being configured to be fluidly connected to a source of flush water;

a three-way valve having a first fluid intake end, a first fluid discharge end and a second fluid discharge end;

said first fluid intake end of said three-way being fluidly connected to said fluid discharge end of said tee;

said first fluid discharge end of said three-way valve being configured to be selectively fluidly connected to a storage tank;

said second fluid discharge end of said three-way valve being configured to be selectively fluidly connected to one of a waste tank or said brine production system; and a control panel including a Programmable Logic Controller and a computer which is cable connected to said transmitter of said mass flow sensor, a water on-off valve, said control valve and said three-way valve for controlling the operation of said water on-off valve, said control valve and said three-way valve.

6. The automatic brine salinity control system of claim 5 wherein said mass flow sensor continually measures the mass flow rate, the volume metric flow rate, the density and the temperature of the fluid passing therethrough and transmits the associated data to said Programmable Logic Controller and computer.

\* \* \* \* \*